(12) United States Patent
Francis

(10) Patent No.: US 6,888,995 B2
(45) Date of Patent: May 3, 2005

(54) HERMETIC FIBER OPTIC PACKAGE

(75) Inventor: Kurt Francis, Yuma, AZ (US)

(73) Assignee: Little Optics, Inc., Annapolis Junction, MD (US)

( * ) Notice: Subject to any disclaimer, the term of this patent is extended or adjusted under 35 U.S.C. 154(b) by 178 days.

(21) Appl. No.: 10/414,112

(22) Filed: Apr. 16, 2003

(65) Prior Publication Data
US 2003/0194198 A1 Oct. 16, 2003

Related U.S. Application Data

(60) Provisional application No. 60/373,090, filed on Apr. 16, 2002.

(51) Int. Cl.$^7$ .............................. G02B 6/00; G02B 6/36
(52) U.S. Cl. ......................... 385/137; 257/49; 385/147
(58) Field of Search ............................ 385/14, 80, 83, 385/88–93, 137, 131, 132, 134, 147; 29/487, 845; 430/311, 315; 257/81.49

(56) References Cited

U.S. PATENT DOCUMENTS

| 4,546,065 | A | * | 10/1985 | Amendola et al. ........... 430/313 |
|---|---|---|---|---|
| 5,262,364 | A | | 11/1993 | Brow et al. .................... 501/24 |
| 5,379,186 | A | | 1/1995 | Gold et al. ................... 361/706 |
| 5,588,086 | A | | 12/1996 | Fan .............................. 385/138 |
| 5,719,978 | A | | 2/1998 | Kakii et al. .................... 385/89 |
| 6,071,017 | A | | 6/2000 | Gilliland et al. ............... 385/93 |
| 6,194,789 | B1 | | 2/2001 | Zhou ........................... 257/790 |
| 6,585,427 | B2 | * | 7/2003 | Finot et al. .................... 385/92 |
| 2002/0025126 | A1 | * | 2/2002 | Finot et al. .................... 385/92 |
| 2002/0123073 | A1 | * | 9/2002 | Amirkhanian et al. ........ 435/7.1 |

* cited by examiner

Primary Examiner—Akm Enayet Ullah

(57) ABSTRACT

The present invention provides a package for hermetically sealing optical fibers such that they optically communicate with other optical elements/devices. First and second substrates include one or more grooves formed in a surface for retaining individual optical fibers in opposing grooves. The substrate/fiber assembly is coated with at least one layer of material to assist in providing a substantially hermetic seal between substrate/fiber assembly and a housing bonding material. This material layer(s) is/are typically selected to minimize the material differences between the substrate/fiber assembly and the housing. The housing surrounds at least a portion of the fiber/substrate assembly and may contain one or more optical elements/devices for optically communicating with optical fibers positioned in the first and second substrate grooves.

12 Claims, 4 Drawing Sheets

HERMETIC FIBER OPTIC PACKAGE

CROSS-REFERENCE TO RELATED APPLICATIONS

This application claims priority to provisional application No. 60/373,090 filed Apr. 16, 2002, the disclosure of which is incorporated by reference herein.

BACKGROUND OF THE INVENTION

1. Field of the Invention

The present invention relates to packaging that permits hermetic passage of one or more optical fiber(s) through a barrier wall. More particularly this invention relates to reliable and low cost hermetic seals for ribbonized (fiber counts greater than one) fiber optic cable feed-through.

2. Description of the Related Art

Packaging of fiber optic devices is driven by the need to achieve low cost while at the same time maintaining high reliability for extended operational life, for example in excess of 20 years. It is particularly important to achieve a hermetic seal around the fiber optic cable as it enters the device package. In this context, the hermetic seal is required to provide a good barrier to the ingress of moisture, which can cause damage to the fiber optic devices within the package.

According to one method for hermetically sealing of fiber optic cables, a glass to metal seal is formed between the fiber optic cable and its supporting tube or sleeve. This involves locally heating a stripped portion of the fiber optic cable to around 500 C to reflow a precision solder glass bead positioned at an appropriate place to form the seal. At the same time, the fiber jacket, or protective outer coating must be maintained to below 90 C to avoid damage to the coating. Control of the reflow profile is quite critical as high stress concentrations can lead to damage to the optical fiber and subsequent light attenuation in use.

According to another method, the fiber optic cable is coated with metal (for example titanium/platinum/gold or titanium/tungsten/gold) and then soldered to its support tube. This approach involves costly metal deposition processes to coat the individual fibers. It is also difficult to maintain adhesion of the coating to the fiber. In addition, as with the first method mentioned above, the required heating can lead to high variations of stress and deformation when processing multiple fibers.

In another type of fiber optic package, an outer sleeve of a material resistant to moisture ingress with an insert is located in the sleeve at one end having a through bore. An optical fiber extends through the bore and beyond the end portion of the sleeve with adhesive films respectively securing the insert to the sleeve and the optical fiber to the insert. This approach involves the use of epoxy as a moisture barrier. Epoxy is a viable short-term solution for creating a moisture barrier; however epoxy will eventually permit moisture diffusion through the package, making the bond line/moisture path an area of concern.

Thus, there is a need for improved hermetic seals for fiber optic packages, particularly seals having improved reliability and seals that are cost-effective and uncomplicated to assemble as fiber counts increase and package dimensions decrease.

SUMMARY OF THE INVENTION:

The present invention provides a package for hermetically sealing optical fibers such that they optically communicate with other optical elements/devices. First and second substrates include one or more grooves formed in a surface for retaining individual optical fibers in opposing grooves. The substrate/fiber assembly is coated with at least one layer of material to assist in providing a substantially hermetic seal between substrate/fiber assembly and a housing bonding material. This material layer(s) is/are typically selected to minimize the material differences between the substrate/fiber assembly and the housing. The housing surrounds at least a portion of the fiber/substrate assembly and may contain one or more optical elements/devices for optically communicating with optical fibers positioned in the first and second substrate grooves.

Figure 1:
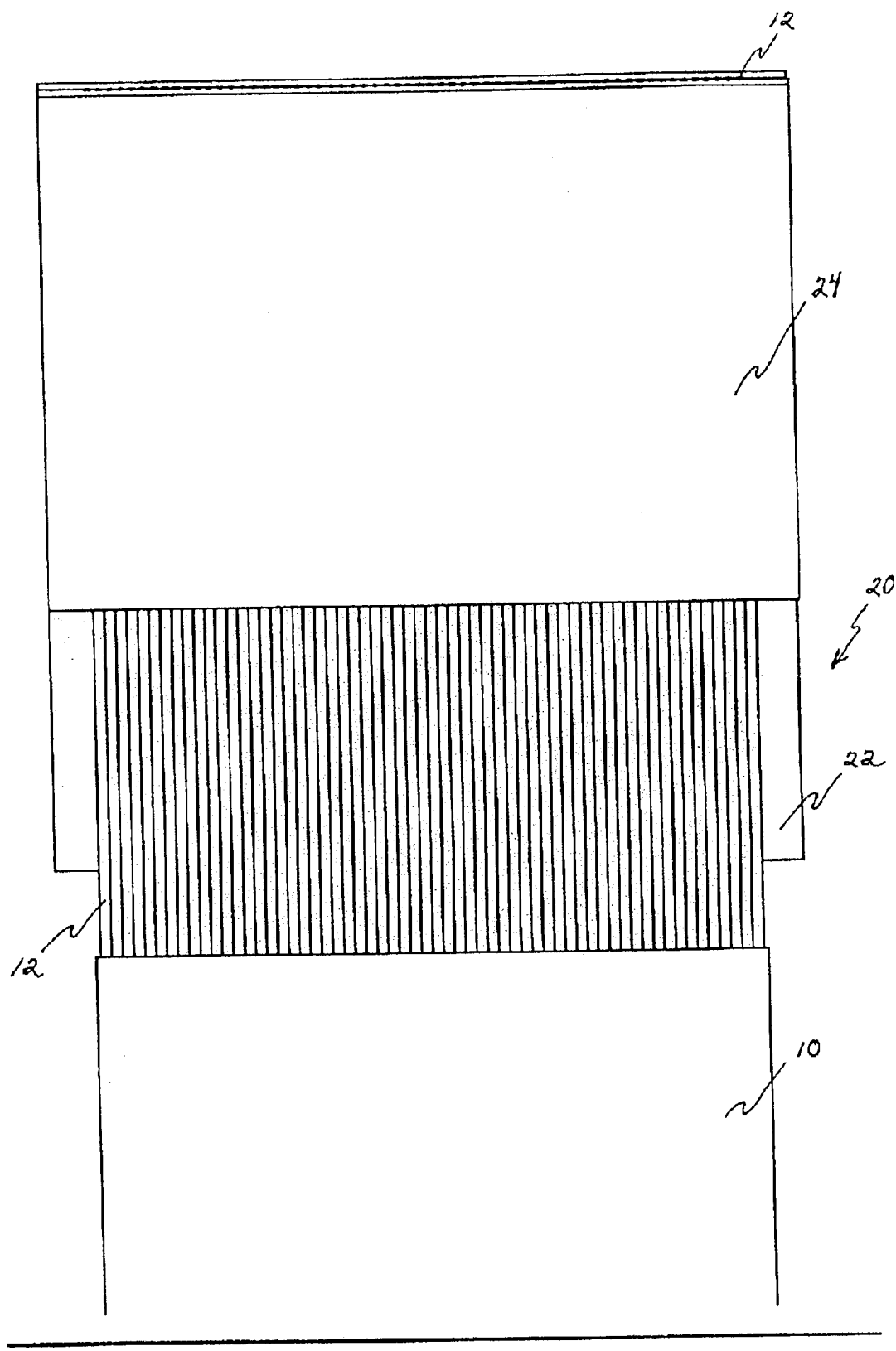
FIG. 1 depicts a top view of a fiber/grooved substrate assembly showing individual optical fibers emerging from a ribbonized cable.

DETAILED DESCRIPTION:

Turning to the drawings in detail in which like numerals indicate the same or similar elements in each of the several views, FIG. 1 depicts a top down view of a fiber optic cable 10 retained by opposing substrates 20. Fiber optic cable 10 is depicted in this embodiment as a plural ribbonized fiber tape having plural individual fibers 12 within an outer housing. Although the invention has particular application to multiple fiber seals and ribbonized cables, it is understood that a single fiber cable or plural single fiber cables can also be used with the packages of the present invention. When fiber optic cable needs to optically communicate with other optical elements or devices, it must be properly packaged to ensure a hermetic seal and to reduce optical losses through precise fiber alignment. The expression "optically communicate," as used herein, refers to any element in an optical system receiving light that has passed through, is generated by, or received by, another optical element or device. For example, an optical fiber may optically communicate with a laser diode upstream and with a photodectector downstream. The laser diode and the photodetector are also in optical communication with one another since the light from the laser passes from the fiber into the photodetector. Two or more elements are in optical communication if they share such a light path regardless of the number and variety of elements positioned in between (e.g., lenses, optical connectors, splices, optical amplifiers, etc.).

Figure 2:
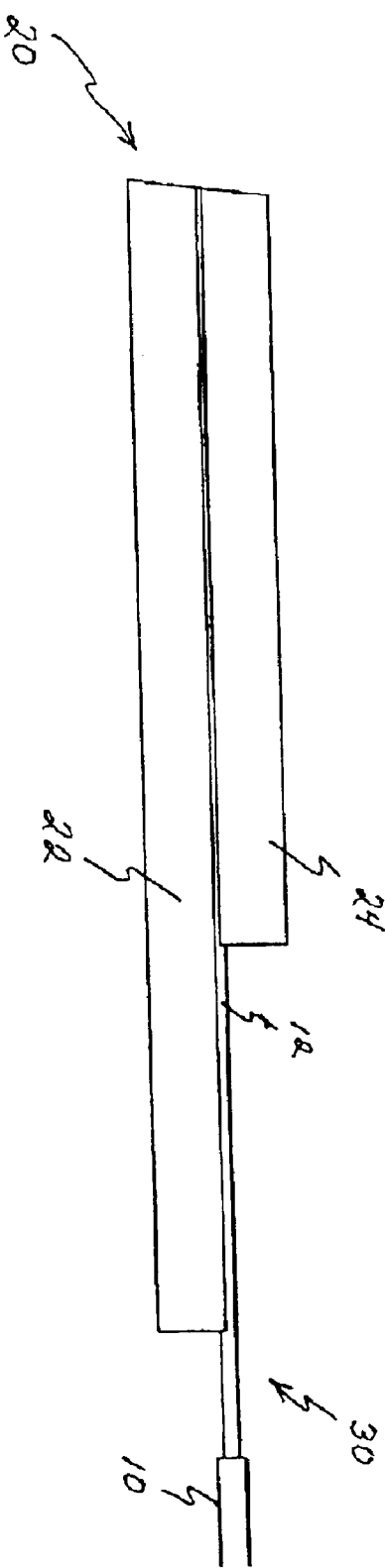
FIG. 2 is a side view of the fiber/substrate assembly of FIG. 1 showing an individual stripped fiber entering the fiber substrate assembly from the fiber cable.
Figure 3:
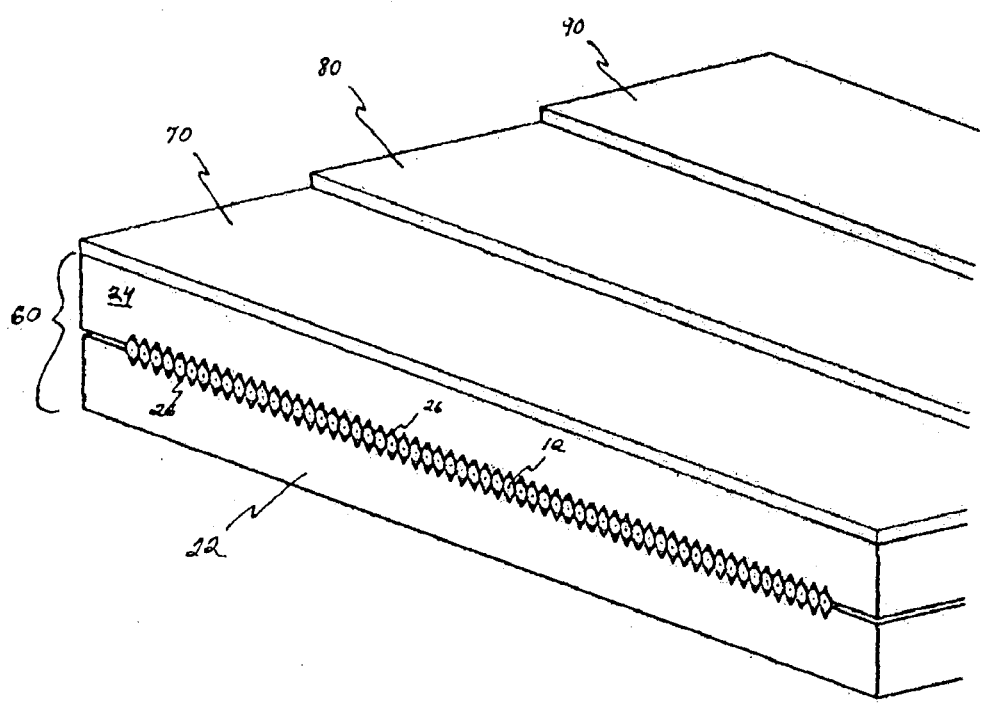
FIG. 3 is a stepped cut away view of a fiber/substrate assembly having one or more material layers to facilitate a hermetic seal with the housing.

As seen in both FIG. 1 and FIG. 2, substrate 22, the lower substrate, is preferably longer than upper substrate 24 for ease of package assembly. Fibers 12 have been stripped of their outer coating, emerging from the ribbonized portion of cable 10, best seen in FIG. 2. Turning to FIG. 3, substrates 22 and 24 are seen to include one or more grooves 26 each of which is configured to retain a portion of fiber 12 (the fibers are viewed in cross-section in FIG. 3). In an exemplary embodiment, substrates 22 and 24 are silicon and are preferentially etched along a set of crystal planes to create the angle of the groove (this angle is 54.74 degrees in the embodiment depicted in the FIGS.). To ensure precise alignment of fibers 12, grooves 26 are typically precision etched to within 0.05 micron reducing optical loss in the resultant package. If a material other than silicon is selected as the substrate material, etching as well as mechanical techniques may be used to form groove(s) 26.

The assembly of fibers and substrates is called the substrate or substrate/fiber assembly and is indicated generally as element 60. Although not shown in the FIGS. for clarity of presentation, individual fibers 12 extend from the proximal end of substrate assembly 60 during package fabrication and are trimmed prior to final bonding to ensure a clean and aligned surface and minimize optical loss. Typically, the fibers are bonded to substrates 22 and 24 to form assembly 60 using an epoxy suitable for use with fibers. The epoxy travels along groove(s) 26 via capillary action, ensuring that fibers 12 are firmly held by the substrates.

To create a hermetic seal between assembly 60 and a housing/package 50 (seen in FIG. 4) one or more material layers are formed on assembly 60 as seen in FIG. 3. Although not shown in FIG. 3 for clarity of presentation, each of the material layer(s) substantially surrounds the substrate/fiber assembly 60 including the stripped/exposed fiber region 30 seen in FIGS. 1 and 2. In an exemplary embodiment, three material layers/layer systems are used. The layer closest to substrates 22 and 24 is an adhesion layer 70. Layer 70 is selected from materials that adhere well both to the substrate material (e.g., silicon) and to subsequent layers or directly to the bonding or soldering agent used to seal assembly 60 into a housing/package. Materials such as tantalum and titanium are common adhesion layers and may be used as layer 70. Optionally, a soldering/bonding layer 80 is formed over layer 70. Although 80 is depicted as a single layer, it is understood that multiple layers may form the soldering/bonding layer 80, particularly when desiring to form alloy solders. In an exemplary embodiment, nickel is used as layer 80.

The final layer or layers 90 are to protect the bonding/ soldering agent from oxidization. Metals such as gold, platinum, and the like are typically selected. The formation techniques for layer(s) 70, 80, and 90 are not critical; thus these layers may be formed through a variety of coating processes such as electroplating, electroless plating, sputtering, ion plating, or any other known process of applying material layers to a substrate. The selection of particular materials and layer thicknesses depend upon the fiber and substrate materials, the housing material, and the material used as the housing soldering/bonding agent. In an exemplary embodiment, the layer(s) 70, 80, and 60 are selected to match material properties (e.g., to minimize the mismatch between the coefficients of thermal expansion of the substrate, fibers, and housing) such that a hermetic seal between the substrate/fiber assembly 60 and the subsequent bonding and housing is formed. Further, the use of plural layers provides sufficient "elasticity" between the substrate/ fiber assembly and the housing bonding material that cracking and other thermal-induced stresses are minimized during formation of the hermetic package.

Figure 4:
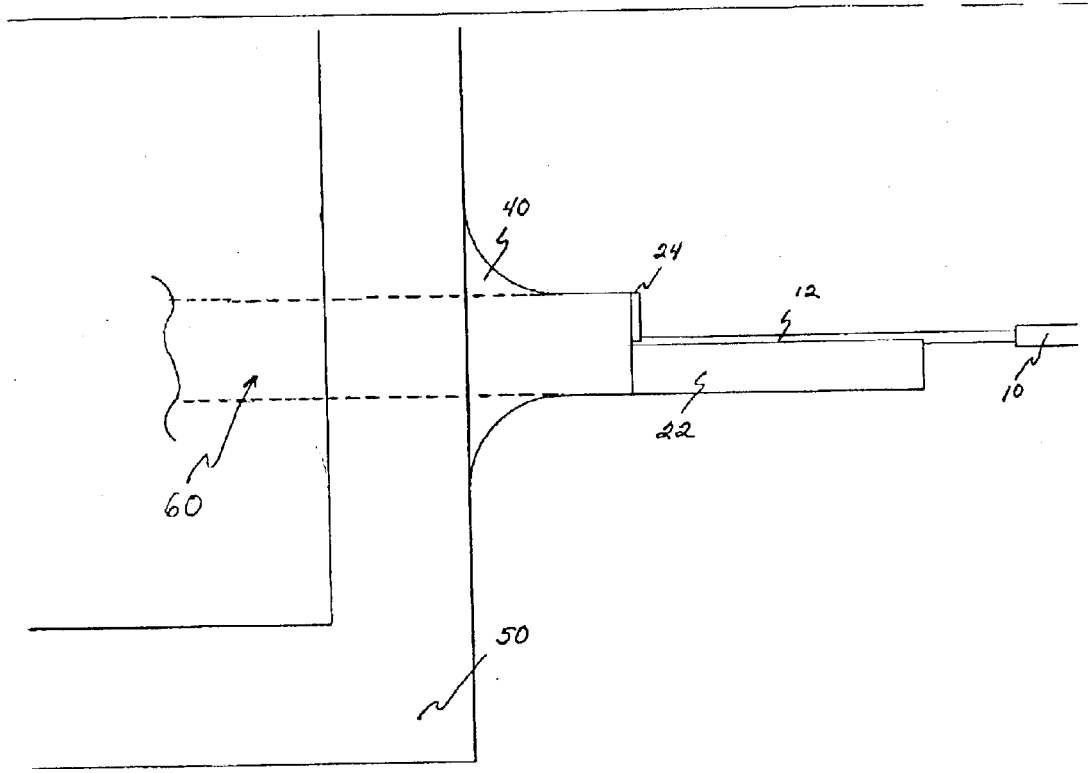
FIG. 4 illustrates a side view of the substrate/fiber assembly of FIG. 2 sealed in a housing/package via a solder/bond material.

Turning to FIG. 4, the coated assembly 60 is bonded/ soldered via bonding/soldering agent 40 into the wall of a hermetic housing 50. The bond/solder 40 can be applied through solder performs, bulk wire solder, laser welding, or other method of hermetic bonding/soldering; the solder may be metal or glass based. This process creates a hermetic seal from the bare fiber region 30 around the substrate/fiber assembly 60, allowing the assembly to be soldered/bonded 40 into housing 50, forming a hermetic seal. The soldered/ bonded block allows the hermetic sealing of any number of fibers with a single solder joint. Note that the term "housing" to describe element 50 is used in a very broad sense. That is, housing 50 is any sort of casing, packaging, or sleeve that receives assembly 60. Housing 50 may contain optical elements/devices such as lenses, multiplexers, laser diodes, and photodetectors or it may include a connector to facilitate optical communication between the optical fibers and upstream or downstream optical elements and or devices. Housing 50 may be selected from known housing/packaging materials such as Kovar, an iron, nickel, cobalt alloy, or it may be selected from a ceramic material such as alumina. Further, housing 50 may take on a variety of shapes and sizes depending upon its function (e.g., whether it includes devices or optical elements).

While the above invention has been described with reference to the particular exemplary embodiments, many modifications and functionally equivalent elements may be substituted without departing from the spirit and contributions of the present invention. Accordingly, modifications and functionally equivalent elements such as those suggested above, but not limited thereto, are considered to be within the scope of the following claims.

What is claimed is:

1. A package for hermetically sealing one or more optical fibers such that they optically communicate with optical elements comprising:

a first substrate having one or more first grooves formed in a first substrate surface, each groove configured to retain an individual optical fiber;

a second substrate having one or more second grooves formed in a second substrate surface, each second groove configured to retain an individual optical fiber, and each second groove positioned opposite a first substrate groove for retaining an optical fiber between opposing first and second grooves such that positioning the first substrate surface adjacent the second substrate surface with one or more optical fibers positioned in the first and second grooves forms a first and second substrate assembly;

a housing configured to surround at least a portion of the first and second substrate assembly, the housing further being configured to retain or optically communicate with one or more optical elements such that the one or more optical elements optically communicate with the one or more optical fibers positioned in the first and second substrate assembly;

at least one layer of material disposed on non-grooved surfaces of the first and second substrate assembly, the at least one layer of material being selected to assist in providing a substantially hermetic seal between the first and second substrate assembly and a housing bonding material.

2. A package for hermetically sealing one or more optical fibers as recited in claim 1 wherein the first and second substrates comprise silicon.

3. A package for hermetically sealing one or more optical fibers as recited in claim 2 wherein the grooves are formed in the first and second substrates through preferential etching.

4. A package for hermetically sealing one or more optical fibers as recited in claim 1 wherein one or more fibers are polymer based.

5. A package for hermetically sealing one or more optical fibers as recited in claim 1 wherein one or more fibers are glass based.

6. A package for hermetically sealing one or more optical fibers as recited in claim 1 wherein the housing bonding material is metal-based solder.

7. A package for hermetically sealing one or more optical fibers as recited in claim 1 wherein the housing bonding material is glass-based solder.

8. A package for hermetically sealing one or more optical fibers as recited in claim 1 wherein the at least one material layer includes two material layers, a first material layer to enhance adhesion between the substrate and second material layer to act as a soldering material.

9. A package for hermetically sealing one or more optical fibers as recited in claim 1 further comprising a third material layer for oxidation protection layer.

10. A package for hermetically sealing one or more optical fibers as recited in claim 1 wherein the housing is an iron-nickel cobalt alloy.

11. A package for hermetically sealing one or more optical fibers as recited in claim 1 wherein the housing is a ceramic material.

12. A package for hermetically sealing one or more optical fibers as recited in claim 11 wherein the ceramic comprises alumina.

* * * * *